(12) United States Patent
Marble

(10) Patent No.: US 10,094,442 B2
(45) Date of Patent: Oct. 9, 2018

(54) VIBRATION DAMPER

(71) Applicant: GM Global Technology Operations LLC, Detroit, MI (US)

(72) Inventor: Robert P. Marble, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/413,771

(22) Filed: Jan. 24, 2017

(65) Prior Publication Data

US 2018/0209507 A1      Jul. 26, 2018

(51) Int. Cl.
  *F16F 9/36*     (2006.01)
  *F16F 9/20*     (2006.01)
  *F16F 9/346*    (2006.01)

(52) U.S. Cl.
  CPC ............... *F16F 9/362* (2013.01); *F16F 9/20* (2013.01); *F16F 9/346* (2013.01); *F16F 2222/04* (2013.01); *F16F 2222/12* (2013.01)

(58) Field of Classification Search
  CPC .. F16F 9/20; F16F 9/346; F16F 9/3465; F16F 9/362; F16F 2222/04; F16F 2222/12; F16F 7/087; F16F 7/125; F16D 63/008
  USPC .... 188/286, 379, 381, 312, 322.17, 271, 67; 267/113, 118, 129, 196, 217
  See application file for complete search history.

(56) References Cited

U.S. PATENT DOCUMENTS 4,385,665 A  *  5/1983  Knoll .................... B25D 17/24
                                              173/162.1

* cited by examiner

*Primary Examiner* — Thomas J Williams
(74) *Attorney, Agent, or Firm* — Cantor Colburn LLP

(57) ABSTRACT

A vibration damper includes a housing and a piston rod construct and arranged to reciprocate along an axis and with respect to the housing. The housing defines first and second ports. A chamber is defined by the housing and the piston rod and is in fluid communication between the first and second ports. A translating isolator of the damper is located in the chamber and is in sealing contact with the piston rod and the housing. The isolator translates in a first direction toward the first port when the piston rod moves in the first direction and translates in an opposite second direction toward the second port when the piston rod moves in the second direction.

11 Claims, 3 Drawing Sheets

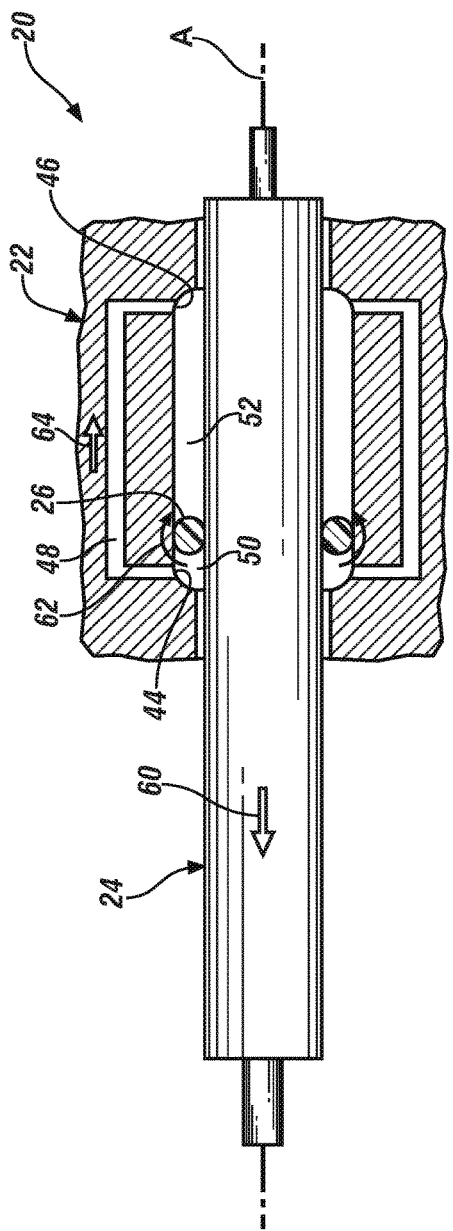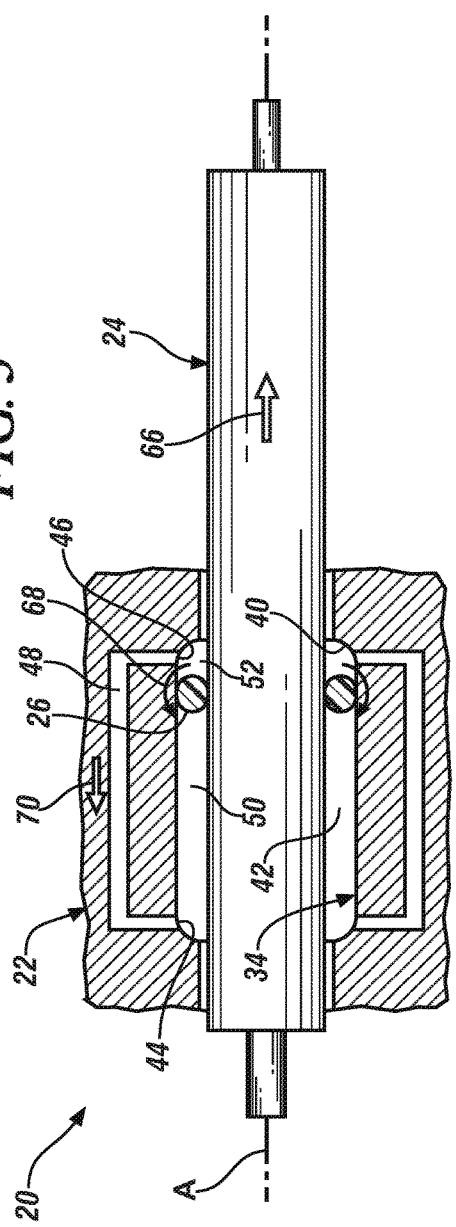
FIG. 3
FIG. 4

VIBRATION DAMPER

INTRODUCTION

The subject disclosure relates to a vibration damper, and more particularly, to a hydraulic vibration damper with a translating fluid isolator.

Hydraulic vibration dampers, also known as shock absorbers, generally convert kinetic energy of moving parts into thermal energy while reducing excessive oscillation amplitudes (i.e., vibration). The damper generally includes a pressure tube, a piston rod, and a hydraulic fluid. The piston rod is disposed within the pressure tube with seals that seal an inner hydraulic chamber defined by the pressure tube from atmosphere. When operating, the hydraulic fluid is pressed through bores generally carried by or in the piston rod structure via movement of the piston rod. This restricted flow of hydraulic fluid generally dictates the damping force of the vibration damper. Improvements in tuning design capability of vibration dampers, including tuning capability for smaller displacement or vibration amplitude events is desirable.

SUMMARY

A vibration damper according to one, non-limiting, embodiment of the present disclosure includes a housing, a piston rod, and an isolator. The housing defines first and second openings. The piston rod is constructed and arranged to reciprocate along an axis with respect to the housing. A chamber is defined by the housing and the piston rod, and is in fluid communication between the first and second openings. The isolator is disposed in the chamber and is in sealing contact with the piston rod and the housing. The isolator translates in a first direction toward the first opening when the piston rod moves in the first direction and translates in an opposite second direction toward the second opening when the piston rod moves in the second direction.

Additionally to the foregoing embodiment, the first and second openings and the chamber contain a hydraulic fluid.

In the alternative or additionally thereto, in the foregoing embodiment, a passage is in fluid communication between the first and second openings.

In the alternative or additionally thereto, in the foregoing embodiment, the passage, the first opening, the second opening, and the chamber form a closed loop.

In the alternative or additionally thereto, in the foregoing embodiment, the housing extends circumferentially about the piston rod.

In the alternative or additionally thereto, in the foregoing embodiment, the chamber is annular in shape.

In the alternative or additionally thereto, in the foregoing embodiment, the isolator is ring shaped.

In the alternative or additionally thereto, in the foregoing embodiment, the isolator is an o-ring.

In the alternative or additionally thereto, in the foregoing embodiment, the isolator is in rolling contact with the housing and the piston rod.

In the alternative or additionally thereto, in the foregoing embodiment, the isolator is resiliently flexible.

In the alternative or additionally thereto, in the foregoing embodiment, the vibration damper is a vehicle shock absorber.

In the alternative or additionally thereto, in the foregoing embodiment, a diameter of a cross section of the o-ring is greater than diameters of the first and second openings.

A telescoping damper according to another, non-limiting, embodiment includes a piston rod, a housing, first and second seals, and at least one rolling isolator. The piston rod is constructed and arranged to reciprocate along an axis. The housing extends circumferentially about the piston rod, defines a plurality of axially spaced ports, defines at least in-part at least one passage in fluid communication between the plurality of ports, and at least one annular chamber is defined radially between the housing and the piston rod. The first and second seals are carried between, and in contact with, the piston rod and the housing. The first seal is spaced axially from the second seal and the at least one chamber is axially disposed between the first and second seals. The at least one rolling isolator is disposed in the at least one chamber for axial translation between and over the plurality of ports. The at least one rolling isolator is in resilient contact with the housing and the piston rod.

Additionally to the foregoing embodiment, the plurality of ports include first and second ports each in direct fluid communication between a passage of the at least one passage and a chamber of the at least one chamber.

In the alternative or additionally thereto, in the foregoing embodiment, the telescoping damper includes a hydraulic fluid contained in the first and second ports, the passage and the chamber.

In the alternative or additionally thereto, in the foregoing embodiment, the rolling isolator is axially disposed between and defines in-part first and second sub-chambers of the chamber with the first sub-chamber in direct fluid communication with the first port and the second sub-chamber in direct fluid communication with the second port.

In the alternative or additionally thereto, in the foregoing embodiment, the rolling isolator is constructed and arranged to translate in an axial direction as the piston rod moves in the axial direction, and axially translates in an opposite direction as the piston rod moves in the opposite direction.

In the alternative or additionally thereto, in the foregoing embodiment, the first sub-chamber decreases in volume and the second sub-chamber increases in volume as the rolling isolator translates in the axial direction, and the first sub-chamber increases in volume and the second sub-chamber decreases in volume as the rolling isolator translates in the opposite direction.

In the alternative or additionally thereto, in the foregoing embodiment, the rolling isolator is a resiliently flexible o-ring.

The above features and advantages and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 3 is a cross section of the vibration damper with a translating seal of the vibration damper moving in an axial direction;

FIG. 4 is a cross section of the vibration damper with the translating seal moving in an opposite axial direction.

DETAILED DESCRIPTION

Figure 1:
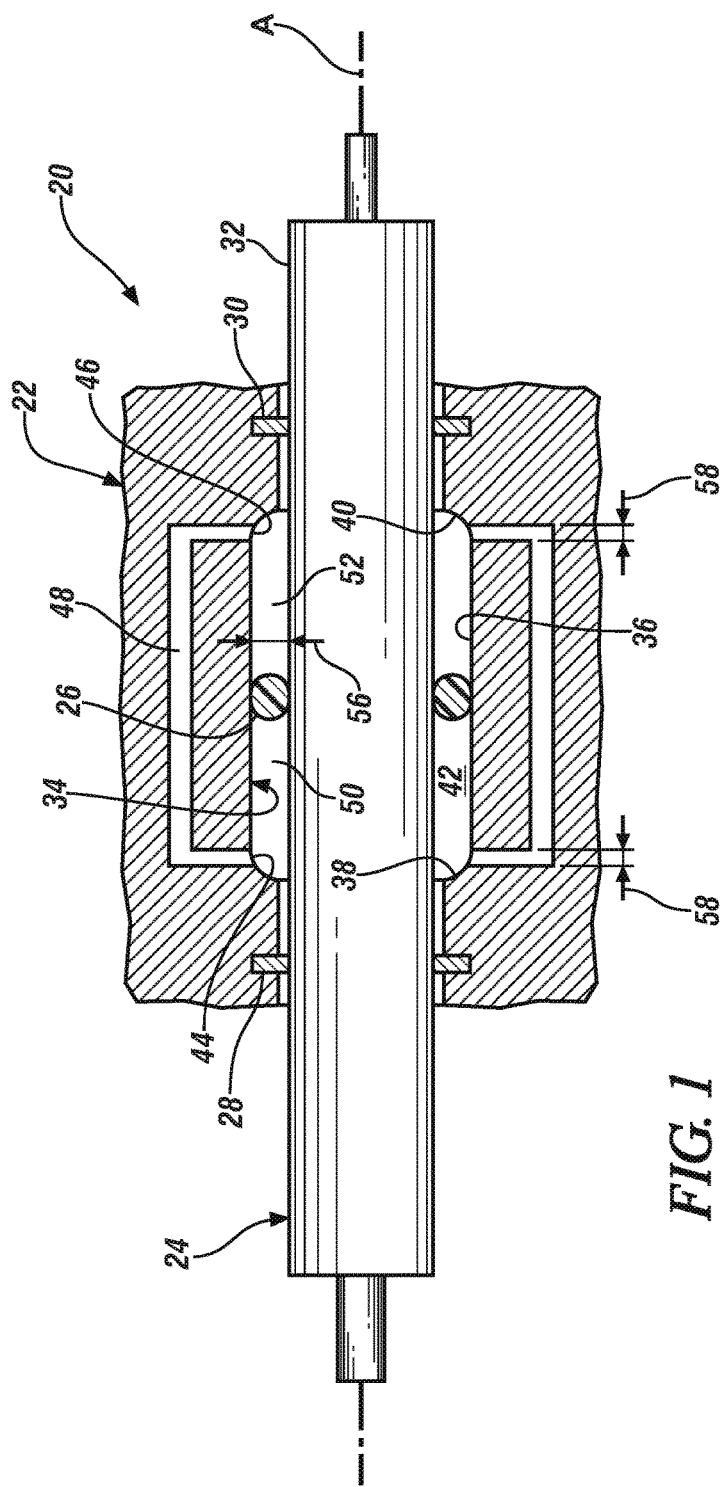
FIG. 1 is a cross section of a vibration damper as one, non-limiting, embodiment in accordance with the present disclosure.

The following description is merely exemplary in nature and is not intended to limit the present disclosure, its application or uses. It should be understood that throughout the drawings, corresponding reference numerals indicate like or corresponding parts and features.

Referring to FIG. 1, a non-limiting, exemplary, embodiment of a telescoping, vibration, damper 20 is illustrated. The vibration damper 20 may include a housing 22, a piston rod 24, a translating fluid isolator 26 and two seals 28, 30. The housing 22 generally surrounds the piston rod 24 that is constructed and arranged to reciprocate along an axis A. The seals 28, 30 are axially spaced from one another and are carried between the housing 22 and the piston rod 24 for the containment of a fluid that may be a hydraulic fluid. In one embodiment, the seals 28, 30 may be seated in the housing 22, and are adapted to sealably slide against a surface 32 of the piston rod 24. The surface 32 may be substantially cylindrical and faces radially outward, and the seals 28, 30 may be circumferentially continuous and/or ring-shaped.

The housing 22 includes a face 34 that substantially opposes the surface 32, and may generally face radially inward with respect to axis A. The face 34 may include a mid-portion 36 that may be circumferentially continuous, substantially cylindrical, and spans axially between two opposing end portions 38, 40. The mid-portion 36 is spaced radially outward from the surface 32 of the piston rod 24. The end portions 38, 40 generally project from the mid-portion 36 and radially inward toward the surface 32 of the piston rod 24. Boundaries of a chamber 42 are defined by the end portions 38, 40, the mid-portion 36 of the face 34 and the surface 32. In the example of the surface 32 and the mid-portion 36 both being cylindrical, the chamber 42 may be generally annular in shape.

The face 34 carried by the housing 22 defines the boundaries of two, axially spaced, ports or openings 44, 46. The first port 44 may be two or more axially aligned and circumferentially spaced ports, and may be proximate to the first end portion 38 of the face 34. The second port 46 may also be two or more axially aligned and circumferentially spaced ports, and may be proximate to the second end portion 40, such that both ports 44, 46 are in fluid communication with opposite ends of the chamber 42.

The housing 22 may further define boundaries of a passage 48 that extends between, and is in fluid communication with, the ports 44, 46. The ports 44, 46, the chamber 42, and the passage 48 may generally be a closed loop circuit capable of flowing a hydraulic fluid in a direction associated with an axial direction of piston rod movement. In another embodiment, the boundaries of the passage 48 may be substantially defined by another structure generally attached to the housing 22. For example, the passage 48 may be established via a hose or tube connected to, or being part of, the housing 22 at the ports 44, 46. It is contemplated and understood that the ports 44, 46 include any variety of openings or shapes including slits or slots. In one example, each port 44, 46 may be circumferentially continuous, communicating radially outward for direct fluid communication with the passage 48 that may, in one alternative embodiment, be annular in shape.

The translating fluid isolator 26 is located in the chamber 42, and divides the chamber into two sub-chambers 50, 52. During operation of the vibration damper 20, and as the piston rod 24 reciprocates along axis A, the isolator 26 translates axially within the chamber 42 and with respect to the housing 22 and the piston rod 24, thus changing the volumes of the two sub-chambers 50, 52. That is, as one sub-chamber increases in volume, the other sub-chamber decreases in volume and the hydraulic fluid is displaced accordingly.

Figure 2:
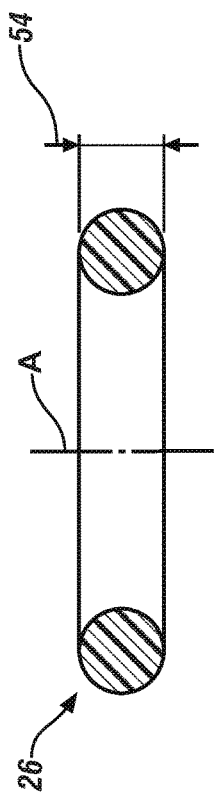
FIG. 2 is a cross section of a translating isolator of the vibration damper.

Referring to FIGS. 1 and 2, and in one embodiment, the axial translation of the isolator 26 is accomplished via a rolling action of the isolator itself. More specifically, the isolator 26 may have a substantially round cross section that rolls upon the surface 32 of the piston rod 24 and the mid-portion 36 of the face 34. In the illustrated embodiment, the translating fluid isolator 26 may be ring-shaped and/or may be an elastomeric o-ring that resiliently bears and seals upon the mid-portion 36 of the face 34 and opposing surface 32 of the piston rod 24. A cross section diameter (see arrows 54 in FIG. 2) of the isolator 26 may be slightly greater than a distance (see arrows 56 in FIG. 1) measured between the mid-portion 36 of the face 34 and the piston rod surface 32. Moreover, the cross section diameter 54 may be greater than a diameter, or axial width with respect to axis A, (see arrows 58 in FIG. 1) of each port 44, 46.

Referring to FIGS. 1 and 3, and in operation of the vibration damper 20, as the piston rod 24 moves in a first axial direction (see arrow 60 in FIG. 3), the isolator 26 translates in the first axial direction 60 while rotating upon itself in a first rotational direction or orientation (see arrows 62 in FIG. 3). As the isolator 26 translates along the first axial direction 60, the first sub-chamber 50 reduces in volume and the second sub-chamber 52 increases in volume, thus the hydraulic fluid flows (see arrow 64 in FIG. 3) through the first port 44, through the passage 48, through the second port 46, and into the second sub-chamber 52. The resistance to the hydraulic fluid flow generally created by the flow cross sectional area of the passage 48, the first port 44, and/or the second port 46 creates, or contributes toward, the damping effect of the vibration damper 20. The axial displacement of the isolator 26 with respect to the housing 22 in the first axial direction 60 is less than the displacement of the piston rod 24 with respect to the housing 22. This difference in axial displacement is generally dependent upon the diameter 54 (see FIG. 2) of the isolator 26.

With continued operation, the isolator 26 may continue to translate in the first axial direction 60 until the isolator bears upon the end portion 38 of the housing face 34 and/or seals-off the first port 44. At this point, any further translation of the piston rod 24 with respect to the housing 22 in the first axial direction 60 may be conducted against a frictional force between the isolator 26 and the piston rod surface 32 since the isolator 26 must now slide against the surface 32 and may not rotate. The frictional force produced may create a greater resistance toward piston rod translation in the first axial direction 60 than that created by the resistance to fluid flow when the isolator 26 was rotating.

With reference to FIGS. 1 and 4, and in operation of the vibration damper 20, as the piston rod 24 moves in an opposite second axial direction (see arrow 66 in FIG. 4), the isolator 26 translates in the second axial direction 66 while rotating upon itself in an opposite second rotational direction or orientation (see arrows 68). As the isolator 26 translates along axial direction 66, the second sub-chamber 52 of chamber 42 decreases in volume and the first sub-chamber 50 increases in volume, thus the hydraulic fluid flows (see arrow 70) through the second port 46, into and through the passage 48, through the first port 44, and into the first sub-chamber 50. The resistance to the hydraulic flow generally created by the flow cross sectional area of the passage 48, the first port 44, and/or the second port 46 creates the damping effect of the vibration damper 20.

With continued operation, the isolator 26 may continue to translate in the second axial direction 66 until the isolator bears upon the end portion 40 of the housing face 34 and/or seals-off the second port 46. At this point, any further translation of the piston rod 24 with respect to the housing 22 in the second axial direction 66 may be conducted against the frictional force between the isolator 26 and the piston rod surface 32 since the isolator 26 must now slide against the surface 32 and may not rotate. The frictional force produced may create a greater resistance toward piston rod translation in the second axial direction 66 than that created by the resistance to fluid flow when the isolator 26 was rotating.

Figure 5:
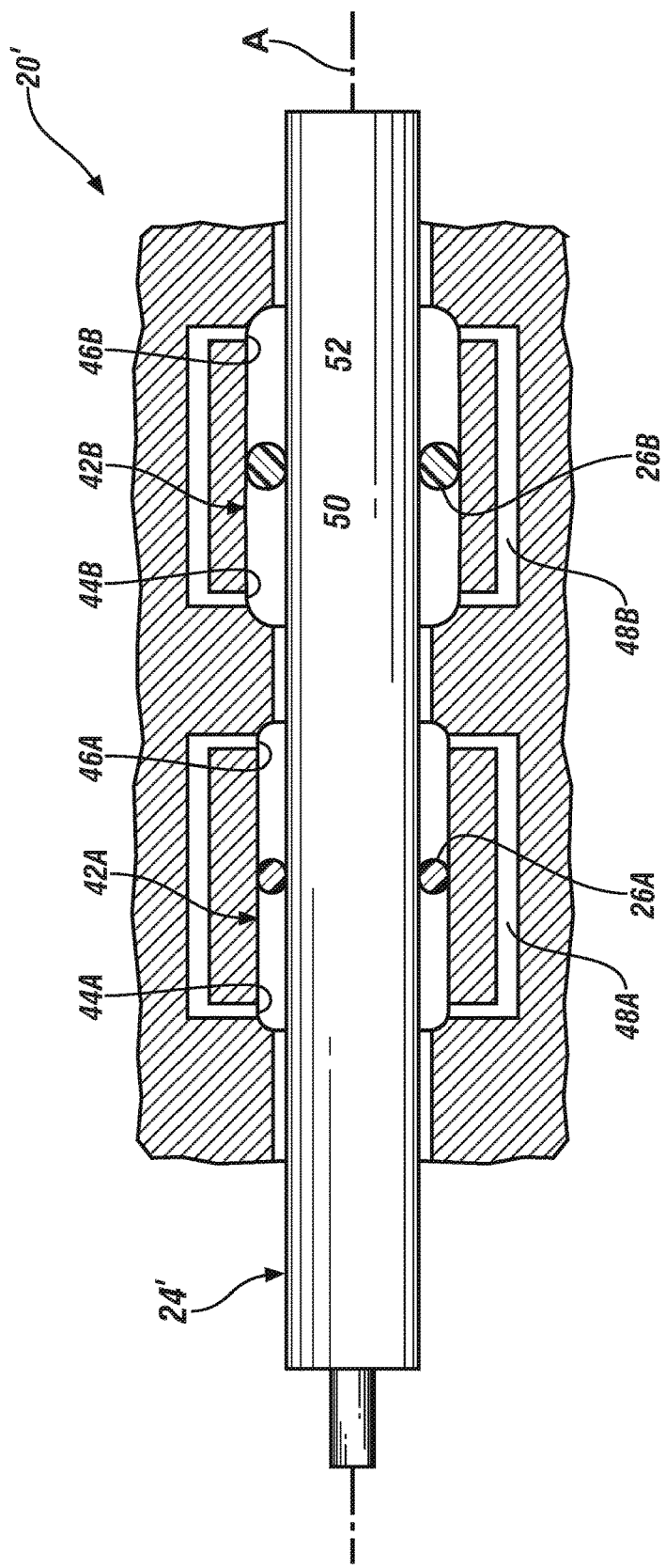
FIG. 5 is a cross section of a second embodiment of the vibration damper.

Referring to FIG. 5, a second embodiment of a vibration damper is illustrated wherein like elements to the first embodiment have the same element number except with the added suffix of a letter or prime symbol. As the second embodiment, a vibration damper 20' may include two axially spaced chambers 42A, 42B. Chamber 42A may communicate with associated ports 44A, 46A, and chamber 42B may communicate with ports 44B, 46B. In the illustrated embodiment, each chamber 42A, 42B may be associated with a respective dedicated passage 48A, 48B. Alternatively, all four ports 44A, 46A, 44B, 46B may communicate with a common passage. The vibration damper 20' may further include two rotating isolators 26A, 26B. Isolator 26A is located in chamber 42A, and isolator 26B is located in chamber 42B. Respective diameters of the isolators 26A, 26B may be different and designed to create a desired damping force profile with respect to an axial location or position of a piston rod 24' during piston rod reciprocation. It is contemplated and understood, that other orientations are plausible which may influence the damping force profile. For example, more than two axial spaced ports may communicate with any one chamber and the ports may not all have the same flow cross sectional areas.

It is further contemplated and understood that applications of the vibration damper may include a shock absorber such as that used in the suspension of vehicles. Other applications may include a powertrain accessory drive tensioner damper, a snubber, and others.

Advantages and benefits of the present disclosure may include improved vibration damping for small displacements caused, for example, by road texture, and a damper with travel ends or terminations that offer smooth stop capability. Another advantage may include an improved design tuning capability. For example, the damping rate may be adjusted via the sizing of the ports, the diameter of the isolator may define damping (i.e., flow area in porting), and the axial length of the chamber may define effective operating travel of the damper.

While the disclosure is described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the application without departing from the essential scope thereof. Therefore, it is intended that the disclosure is not limited to the particular embodiments, but includes all embodiments falling within the scope of the application.

What is claimed is:

1. A vibration damper comprising:
   a housing defining first and second openings;
   a piston rod constructed and arranged to reciprocate along an axis and with respect to the housing, wherein a chamber is defined by the housing and the piston rod and is in fluid communication between the first and second openings; and
   an isolator disposed in the chamber and in sealing contact with the piston rod and the housing, and wherein the isolator translates in a first direction toward the first opening when the piston rod moves in the first direction and translates in an opposite second direction toward the second opening when the piston rod moves in the second direction, wherein the housing extends circumferentially about the piston rod, the chamber is annular in shape, the isolator is ring shaped, the isolator is an o-ring, and the isolator is in rolling contact with the housing and the piston rod.

2. The vibration damper set forth in claim 1, wherein the isolator is resiliently flexible.

3. The vibration damper set forth in claim 2, wherein the vibration damper is a vehicle shock absorber.

4. The vibration damper set forth in claim 1, wherein a diameter of a cross section of the o-ring is greater than diameters of the first and second openings.

5. A telescoping damper comprising:
   a piston rod constructed and arranged to reciprocate along an axis;
   a housing extending circumferentially about the piston rod, defining a plurality of axially spaced ports, defining at least in-part at least one passage in fluid communication between the plurality of ports, and wherein at least one annular chamber is defined radially between the housing and the piston rod;
   first and second seals carried between and in contact with the piston rod and the housing, wherein the first seal is spaced axially from the second seal and the at least one annular chamber is axially disposed between the first and second seals; and
   at least one rolling isolator disposed in the at least one chamber for axial translation between and over the plurality of ports, wherein the at least one rolling isolator is in resilient contact with the housing and the piston rod.

6. The telescoping damper set forth in claim 5, wherein the plurality of ports include first and second ports each in direct fluid communication between a passage of the at least one passage and a chamber of the at least one annular chamber.

7. The telescoping damper set forth in claim 6 further comprising:
   a hydraulic fluid contained in the first and second ports, the passage and the chamber of the at least one annular chamber.

8. The telescoping damper set forth in claim 7, wherein the rolling isolator is axially disposed between and defines in-part first and second sub-chambers of the chamber with the first sub-chamber in direct fluid communication with the first port and the second sub-chamber in direct fluid communication with the second port.

9. The telescoping damper set forth in claim 8, wherein the rolling isolator is constructed and arranged to translate in an axial direction as the piston rod moves in the axial direction, and axially translates in an opposite direction as the piston rod moves in the opposite direction.

10. The telescoping damper set forth in claim 9, wherein the first sub-chamber decreases in volume and the second sub-chamber increases in volume as the rolling isolator translates in the axial direction, and the first sub-chamber increases in volume and the second sub-chamber decreases in volume as the rolling isolator translates in the opposite direction.

11. The telescoping damper set forth in claim 10, wherein the rolling isolator is a resiliently flexible o-ring.

\* \* \* \* \*